US 6,600,937 B1

(12) United States Patent
Hörngren

(10) Patent No.: US 6,600,937 B1
(45) Date of Patent: Jul. 29, 2003

(54) VIBRATOR ASSEMBLY FOR MOBILE TELEPHONE

(75) Inventor: Tobias Hörngren, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/422,624

(22) Filed: Oct. 21, 1999

Related U.S. Application Data

(60) Provisional application No. 60/124,747, filed on Mar. 17, 1999.

(51) Int. Cl.[7] .................................................. H04B 1/38
(52) U.S. Cl. .................... 455/567; 455/550; 455/90; 340/407.1
(58) Field of Search ................. 455/567, 550, 455/575, 90, 347, 349, 572; 340/407.1

(56) References Cited

U.S. PATENT DOCUMENTS 5,436,622 A * 7/1995 Gutman et al. ........ 340/825.46
6,028,278 A * 2/2000 Fluman ...................... 200/512
6,160,489 A * 12/2000 Perry et al. ............. 340/825.44

FOREIGN PATENT DOCUMENTS

GB          2259205         3/1993

* cited by examiner

Primary Examiner—William Trost
Assistant Examiner—Eugene Yun
(74) Attorney, Agent, or Firm—Burns, Doane, Swecker & Mathis L.L.P.

(57) ABSTRACT

A vibrator assembly for use in a mobile telephone includes a contact plate and a vibrator motor electrically connected to the contact plate with flexible wires. The contact plate has positive and negative electrical contacts on its upper surface for establishing an electrical connection with corresponding electrical contacts on a printed circuit board. The shaft of a fastener passes through an aperture in the printed circuit board and the contact plate to secure them to the base of the phone. The negative electrical contact is electrically connected to a frame member of the phone to provide electromagnetic shielding.

24 Claims, 2 Drawing Sheets

VIBRATOR ASSEMBLY FOR MOBILE TELEPHONE

RELATED APPLICATION

This application is related to, and claims priority from, U.S. Provisional Application Serial No. 60/124,747 entitled "Vibrator Connector" filed on Mar. 17, 1999, the disclosure of which is expressly incorporated herein by reference.

BACKGROUND

The present invention relates to vibrator attaching structures and methods and to vibrator connectors for mobile communications devices, and more particularly to an improved vibrator assembly for use with a mobile communications device such as, for example, a mobile telephone.

Mobile telephones comprise a printed circuit board (PCB) that includes various electrical and electromechanical components encapsulated by a front and back cover. The PCB is adapted to fit between the front and back covers and the covers are designed to fit together with appropriate mechanical fasteners. The front and back cover are typically manufactured from a rigid polymeric material using known plastics manufacturing techniques, primarily injection molding techniques. Alternatively, the front and back covers may be manufactured from various metal alloys using conventional manufacturing techniques. In some instances, an internal metal frame may be used in the back cover to enhance the structural integrity of the phone.

Users of any telephone system, including mobile telephones, are accustomed to receiving an audible ring to notify the user of an incoming call on the phone. As an alternative to an audible ring, a phone may be equipped with a vibrating assembly that causes the mobile phone to vibrate to alert the user to an incoming call. Such vibrating assemblies typically include a small electric motor, referred to as a vibrator motor, that drives a rotating shaft having a center of mass displaced from the axis of rotation, thereby causing a vibration when the shaft rotates. The vibrating motor must be electrically connected to a power supply associated with the mobile phone.

The addition of vibrating assemblies to mobile phones raises some unique design problems. The vibrating assembly must be physically connected to the mobile phone in a manner that enables its vibrations to propagate through the housing of the mobile phone, so that the user may feel an incoming call alert. Further, the vibrating assembly must be electrically connected to a power source. This electrical connection may be established through circuitry on the printed circuit board. The electrical connection between the electric motor and the printed circuit board must remain secure in spite of repeated exposure to significant mechanical vibrations. Further, direct exposure to vibrations from the electric motor may be damaging to the electrical and electromagnetic components located on the printed circuit board. Therefore, it is desirable to isolate the printed circuit board from these vibrations, or at least to dampen or otherwise reduce the propagation of vibrations transmitted to the printed circuit board. In addition, it is desirable to make efficient use of space in the electrical and physical connections between the vibrating device and the mobile phone.

Existing solutions to these problems include making an electrical contact to a vibrator motor using different types of spring connectors, elastomeric connectors, and wire connectors having mating male and female plugs. However, these solutions fail adequately to fulfill the requirement of providing a robust, space-efficient electrical connection between the vibrator assembly and the printed circuit board. The present invention uses novel vibrator assembly designs and assembly techniques to provide a robust, durable, space-efficient electrical connection between a vibrator assembly and a printed circuit board.

SUMMARY

The present invention addresses the aforementioned problems by providing a durable, secure, space-efficient electrical connection between a vibrator motor and a printed circuit board for use in a mobile communications device such as, for example, a mobile telephone. A vibrator assembly according to the invention contributes to the durability of a mobile telephone by reducing the likelihood that the electrical connection between the vibrator assembly and the power source on the printed circuit board will fail due to the stress of repeated vibration alerts.

In one aspect the invention provides a vibrator assembly for use in a communications device. The vibrator assembly comprises a vibrator contact plate for making electrical contact with a printed circuit board. The vibrator contact plate has an upper surface and a lower surface and an aperture for receiving a fastener. Positive and negative electrical contact elements are disposed on the upper surface of the contact plate adjacent the aperture. A vibrator motor is electrically connected to the respective positive and negative contact elements on the vibrator contact plate.

In another aspect, the invention provides a mobile communications device. The device comprises a printed circuit board having electrical and electromechanical components for transceiving electromagnetic signals, a frame for retaining the printed circuit board, and a vibrator assembly including a vibrator motor physically connected to the frame and electrically connected to a vibrator contact plate. The vibrator contact plate has electrical contacts disposed on a surface thereof for establishing an electrical connection with the printed circuit board.

In a further aspect, the invention provides a vibrator contact plate for establishing electrical contact between a printed circuit board and a vibrator motor for use in a mobile communications device. The vibrator contact plate has an upper surface, a lower surface and an aperture for receiving a fastener. Electrical contacts are disposed on the upper surface of the contact plate adjacent the aperture.

In yet another aspect, the invention provides a method of making a mobile communications device having a vibrator assembly for vibrating the device to provide notice of an incoming communications message. According to the method a frame for housing the communications device is provided. The frame includes an aperture for receiving a fastener. A vibrator assembly is positioned adjacent the frame. The vibrator assembly includes a vibrator motor adapted to fit in a compartment within the frame and a vibrator contact plate having an aperture adapted to receive a fastener. The vibrator contact plate assembly is positioned to place the aperture substantially in axial alignment with the aperture in the frame. A printed circuit board is positioned adjacent the vibrator assembly. The circuit board has electrical and electromechanical components for transceiving electromagnetic signals and further has an aperture adapted to receive a fastener. The printed circuit board is positioned to place the aperture substantially in axial alignment with the aperture in the frame and the aperture in the vibrator contact plate. The vibrator assembly and the printed circuit board are connected to the frame by passing a fastener through the apertures in the vibrator assembly and the printed circuit board and securing the fastener to the aperture in the frame.

DETAILED DESCRIPTION

The present invention will be explained with reference to the exemplary embodiments depicted in the following drawings. However, it will be appreciated that the particular embodiments depicted herein are presented for purposes of demonstration and are not intended to be limiting.

Figure 1:
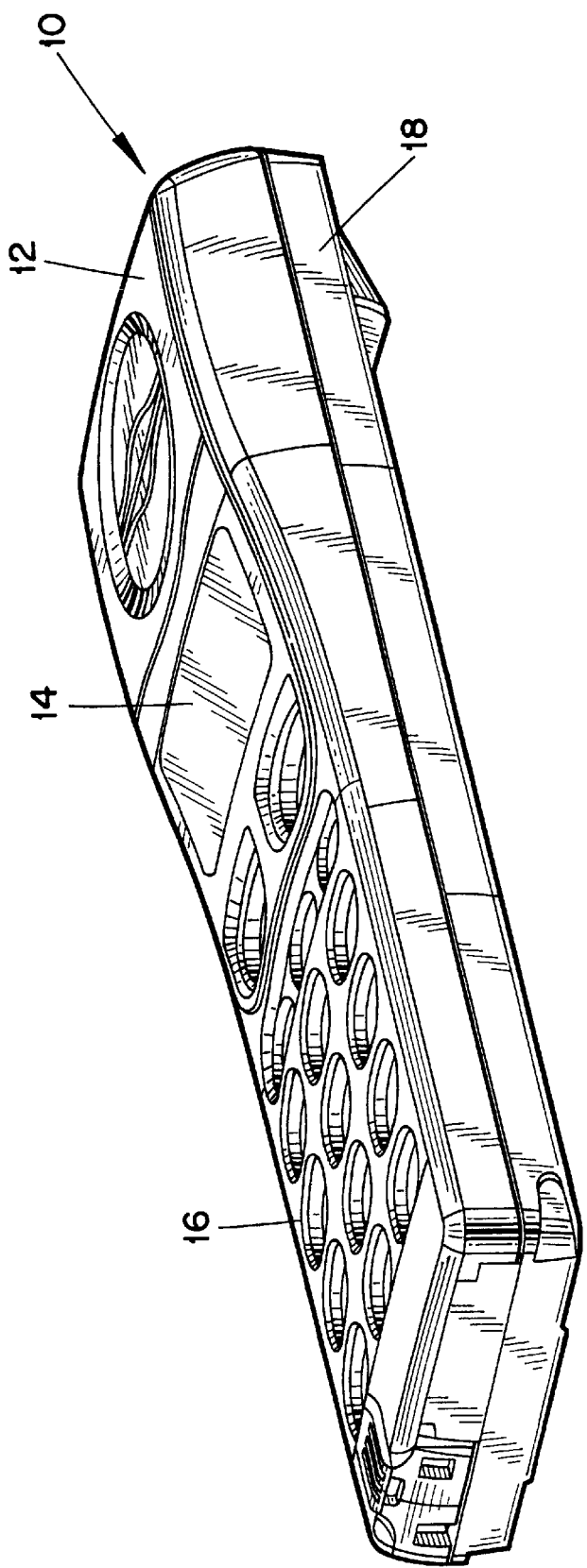
FIG. 1 is a perspective view of a mobile telephone in accordance with aspects of the present invention.

FIG. 1 is a perspective view of a mobile telephone assembly suitable for use in accordance with the invention. Telephone 10 includes a front shell 12 and a base shell 18 that enclose the device. The terms shell, cover, and frame element may be used interchangeably throughout this disclosure. Front shell 12 includes a display screen window 14, and a keypad area with a plurality of key holes 16. Internal components (not shown) commonly include a printed circuit board and a key pad assembly that are encapsulated between front shell 12 and base shell 18. Illustrative examples of mobile telephone assemblies are disclosed in the following documents which are incorporated herein by reference: U.S. Pat. Nos. 5,867,772; 5,838,789.

Figure 2:
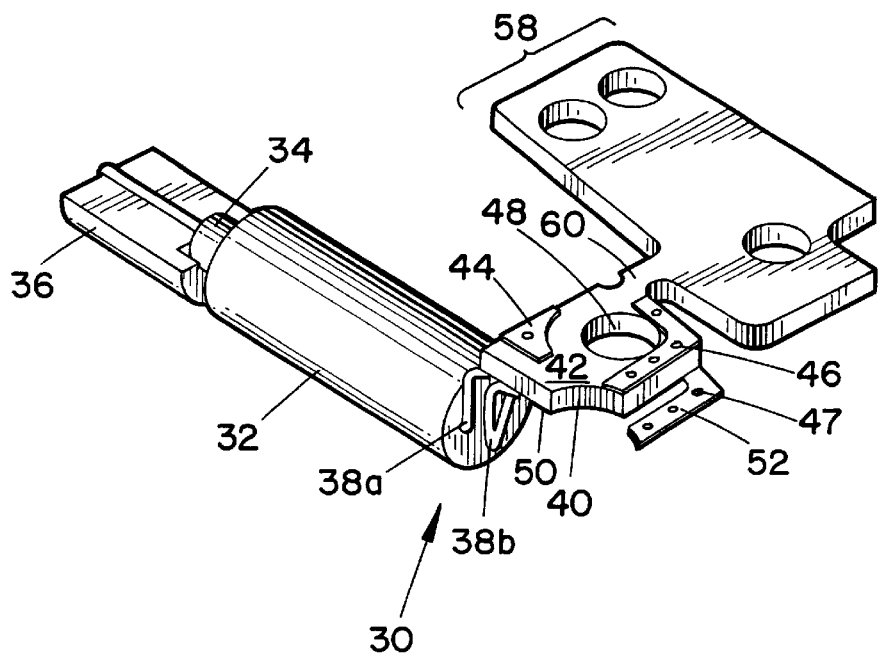
FIG. 2 is a perspective view of a vibrator assembly in accordance with the present invention.

Referring to FIG. 2 there is illustrated a vibrator assembly 30 according to principles of the present invention. Vibrator assembly 30 includes an electric vibrator motor 32 operational to rotate shaft 34, which has its center of mass displaced from its axis of rotation. In the embodiment depicted in FIG. 2 shaft 34 incorporates an off-centered mass element 36, but it will be appreciated that shaft 34 could assume different physical configurations to shift its center of mass away from its center of rotation. Separating the center of mass from the center of rotation causes vibrator motor 32 to vibrate when shaft 34 is rotated.

Vibrator assembly 30 further includes a vibrator contact plate 40 which, in the disclosed embodiment, has a substantially planar upper surface 42 and a substantially planar lower surface 50. It will be appreciated that the designation of upper surface 42 and lower surface 50 is arbitrary. Vibrator contact plate 40 has an aperture 48 formed therein and dimensioned to receive a suitable fastener such as, for example, a screw or rivet. A positive electrical contact element 44 is secured to upper surface 42 of vibrator contact plate 40 adjacent aperture 48. Similarly, a negative electrical contact 46 is secured to upper surface 42 of vibrator contact plate 40 adjacent aperture 48 and substantially in opposing relation to positive electrical contact element 44. In the disclosed embodiment positive electrical contact element 44 and negative electrical contact element 46 are disposed on opposing sides of aperture 48. This is a preferred physical relationship between positive electrical contact element 44 and negative electrical contact element 46.

In a preferred embodiment, negative contact element 46 is electrically connected to a portion of the shell 18 of phone 10 to provide protection from electromagnetic interference. In the disclosed embodiment, an electrically conductive plate 52 is secured to lower surface 50 of vibrator contact plate 40 and is electrically connected to negative electrical contact element 46. Electrically conductive plate 52 secured to the lower surface may be substantially identical to negative electrical contact element 46. According to one embodiment of the invention, vibrator contact plate 40 is formed with a plurality of small (e.g., 0.3 mm) holes 47 extending through the plate. Electrically conductive elements pass through the holes to establish an electrical contact between negative contact element 46 and electrically conductive plate 52. It will be appreciated, however, that numerous other configurations exist for establishing an electrical connection between negative electrical contact element 46 and electrically conductive plate 52 including, without limitation: pre-forming conductive elements in vibrator contact plate 40, and connecting the elements with very small, electrically conductive rivets. The particular mechanism for establishing electrical contact between negative contact element 46 and electrically conductive plate 52 is not critical to the present invention.

Vibrator contact plate 40 further includes a sacrificial element 58 connected to the contact plate by neck segment 60. In the disclosed embodiment sacrificial element 58 includes three holes extending through its surface. These holes may be used by automated assembly machinery to position contact plate 40 during the process of assembling telephone 10. After assembly, the sacrificial element may be removed by breaking neck segment 60, leaving contact plate 40 intact. This process is discussed in greater detail below.

Vibrator motor 32 is electrically connected to vibrator contact plate 40 by wires 38a, 38b. Wire 38a is connected to positive electrical contact element 44 and wire 38b is connected to negative electrical contact element 46. In a preferred embodiment wires 38a and 38b are connected directly to the positive and negative leads, respectively, of the vibrator motor by soldering or the like. Wires 38a and 38b are made of an electrically conductive material (e.g., copper) and, in a preferred embodiment are sufficiently flexible that vibrations from vibrator motor 32 do not propagate through the wires into contact plate 40. Thus, wires 38a, 38b function in part to dampen vibrations from vibrator motor 32 from propagating directly to contact plate 40.

Vibrator contact 40 is preferably made from a dielectric material having sufficient strength and rigidity to withstand being secured between printed circuit board 70 and frame 18 of phone 10. For example, vibrator contact 40 may be manufactured from a material that is the same as, or similar to, printed circuit board 70, namely a glass fiber or epoxy material. Alternatively, vibrator contact may be made from a suitable polymeric material or from an metal or metal alloy coated with a suitable insulator. Electrical contacts 44, 46 and 52 are preferably made from a suitable electrically conductive metal such as, for example, copper.

Figure 3:
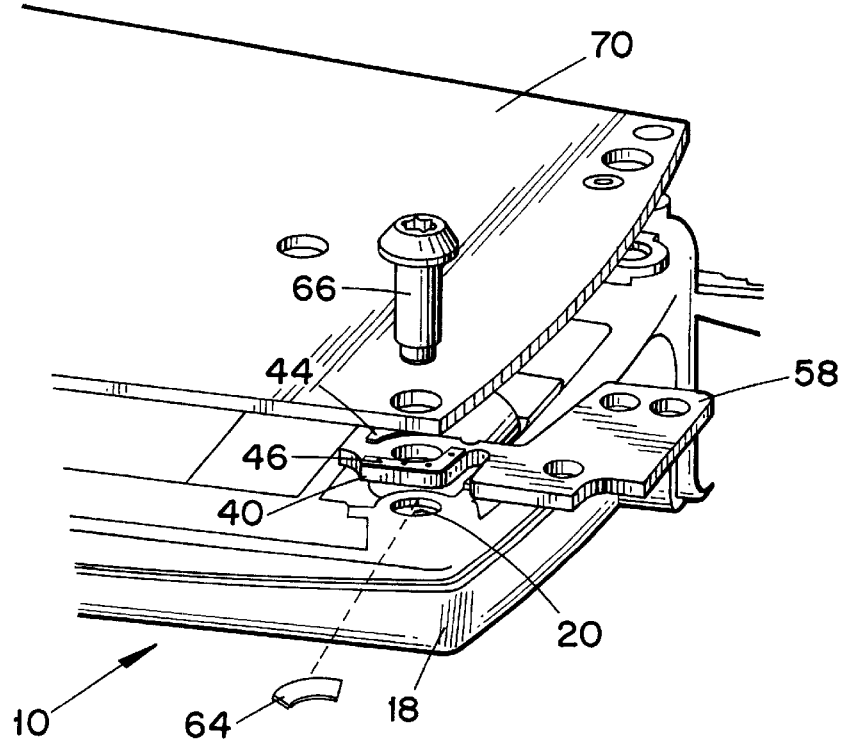
FIG. 3 is a partial exploded, perspective view of a portion of a mobile telephone in accordance with aspects of the present invention.

FIG. 3 is a partial exploded, perspective view of phone 10 illustrating the physical and electrical connections between vibrator assembly 30 and phone 10. A method of assembling a phone 10 and the resulting phone assembly will be explained with reference to FIG. 3. In the assembly of the present invention, vibrator contact plate 40 is secured between printed circuit board 70 and the shell 18 of phone 10 by screw 66. Vibrator motor 32 (FIG. 2) is secured in a suitable compartment in shell 18 of phone 10. Vibrator motor 32 may be secured to shell 18 using conventional mechanical fasteners such as, for example, grommets, screws, snap-fit connectors, or other suitable connectors. Securing vibrator motor 32 to shell 18 enables vibrations from vibrator motor 32 to propagate through shell 18 such that a user can readily detect the vibration alert.

In the assembly of a phone 10 according to the invention, a base shell 18 is provided. Base shell 18 may also be referred to in the art as a cover, housing member or frame. Typically, mobile phones include front and back covers which are connectable by suitable mechanical connectors such as, for example, screws, rivets or snap-fit connections. As discussed above, base shell 18 further includes an aperture 20 for receiving a fastener such as, for example, a screw 66 for securing vibrator contact plate 40 and a portion of printed circuit board 70 to frame base shell 18. One of ordinary skill in the art will recognize that other suitable mechanical fasteners could be used to secure printed circuit board 70 and vibrator contact plate 40 to base shell 18 of phone 10. Suitable fasteners include screws, rivets, grommets, etc. Further, there may be multiple mechanical connections between printed circuit board 70 and base shell 10. The remaining connections are not critical to the present invention and may be made with any suitable mechanical fasteners.

According to the invention, vibrator contact plate 40 is positioned adjacent base shell 18 such that aperture 48 is in substantial axial alignment with aperture 20 in base shell 18. In a preferred embodiment of the invention, contact plate 40 is positioned using automated assembly machinery, but it will be appreciated that the assembly process could be manual. Sacrificial element 58 is useful to retain contact plate 40 in position. As discussed above, the bottom surface of contact plate 40 preferably includes an electrically conductive plate 52 disposed opposite negative electrical contact element 46. It may be desirable to insert a suitable spacer 64 between contact plate 40 and base shell 18. Preferably, the spacer 64 is of substantially the same thickness as the electrically conductive plate 52 disposed on the lower surface 50 of contact plate 40 and is positioned approximately opposite aperture 48 from electrically conductive plate 52. It will be appreciated that the spacer 64 could be attached to the lower surface of contact plate 40 or to the surface of base shell 18. The spacer 64 ensures that contact plate 40 remains substantially level on base shell 18. Spacer 64 is preferably made from a suitable material such as, for example, copper.

Printed circuit board 70 is then positioned adjacent vibrator contact plate 40 such that its aperture is in substantial axial alignment with the apertures in contact plate 40 and base shell 18. Printed circuit board 70 preferably includes electrical connections positioned to correspond with electrical contacts 44, 46 on contact plate 40. The assembly may then be connected by securing screw 66 to aperture 20 in base shell 18. Securing screw 66 compresses contact plate 40 between printed circuit board 70 and base shell 18, thereby providing a secure electrical connection between the printed circuit board 70 and contact plate 40. Additionally, a secure electrical connection is formed between negative electrical element 52 disposed on the lower surface 50 of vibrator contact plate 40 and base shell 18 of phone 10. If base shell 18 is made of an electrically conductive material (e.g., metal) then the electrical connection between contact plate 40 and base shell 18 provides radiation protection for the components inside the device. If base shell 18 is made from a dielectric material (e.g., plastic), an electrically conductive frame member foil or coating may be electrically connected to negative electrical element 52 to provide the radiation protection.

After the assembly is secured the sacrificial element 58 of contact plate 40 may be removed by breaking the plate at neck portion 60. Assembly of phone 10 may then be completed by securing the front shell to base shell 18.

The present invention provides numerous advantages over existing vibrator assemblies used in mobile telephones. Vibrator contact 40 is securely retained between printed circuit board 70 and the frame of phone 10. This facilitates a secure, durable electrical connection between vibrator contact plate 40 and vibrator motor 32. The use of flexible wires to connect vibrator motor 32 to contact plate 40 reduces the propagation of vibrations to printed circuit board 70. Further, because positive contact element 44 and negative contact element 46 are disposed substantially symmetrically about aperture 48, the compressive force provided by screw 66 is distributed approximately equally between positive contact element 44 and negative contact element 46. This also contributes to a secure connection between contact plate 40 and printed circuit board 70.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

I claim:

1. A vibrator assembly for use in a personal communications device, comprising:
   a vibrator contact plate for making electrical contact with a printed circuit board, the vibrator contact plate having an upper surface and a lower surface and having an aperture for receiving a fastener;
   a positive electrical contact element disposed on the upper surface of the vibrator contact plate adjacent the aperture;
   a negative electrical contact element disposed on the upper surface of the vibrator contact plate adjacent the aperture and opposite the positive contact element; and
   a vibrator motor electrically connected to the respective positive and negative contact elements on the vibrator contact plate.

2. A vibrator assembly according to claim 1, wherein:
   the printed circuit board has an aperture for receiving the fastener and corresponding positive and negative electrical contacts disposed on opposing sides of the aperture, such that the vibrator contact plate may be mechanically connected to the printed circuit board with the fastener, thereby establishing secure electrical contacts between the printed circuit board and the contact plate.

3. A vibrator assembly according to claim 2, wherein:
   the positive and negative electrical contact elements on the upper surface of the contact plate are disposed approximately symmetrically about the aperture, such that the when the contact element is secured to the printed circuit board with the fastener, the compressive force generated by the fastener is divided approximately equally between the positive electrical contact and the negative electrical contact.

4. A vibrator assembly according to claim 1, wherein:
   the negative electrical contact is electrically connected to an electrically conductive frame element of the personal communications device to reduce electromagnetic radiation interference.

5. A vibrator assembly according to claim 1, wherein:
   the vibrator contact plate includes an electrically conductive element disposed on its bottom surface and electrically connected to the negative electrical contact.

6. A vibrator assembly according to claim 5, wherein:
the electrically conductive element on the bottom surface of the vibrator contact plate is disposed substantially opposite the negative electrical contact element.

7. A vibrator assembly according to claim 6, wherein:
electrically conductive connectors extend through the vibrator contact plate to provide an electrical connection between the negative contact plate and the electrically conductive element on the bottom surface of the vibrator contact plate.

8. A vibrator assembly according to claim 1, wherein:
the vibrator contact plate includes a sacrificial portion physically connected to the connector by a neck segment, the sacrificial portion adapted for connection to an automatic assembly mechanism which positions the contact plate for assembly.

9. A vibrator assembly according to claim 8, wherein:
the sacrificial portion is removed by breaking the contact plate at the neck segment.

10. A vibrator assembly according to claim 1, wherein:
the vibrator motor is electrically connected to the vibrator contact plate by wires.

11. A vibrator assembly according to claim 1, wherein:
a frame element of the personal communications device includes an aperture adapted to receive the fastener; and
the vibrator contact plate is connected to the frame element of the personal communications by the fastener.

12. A vibrator assembly according to claim 11, further comprising:
a spacing element disposed between the frame element and the vibrator contact plate.

13. A mobile communications device, comprising:
a printed circuit board having electrical and electromechanical components for transceiving electromagnetic signals;
a frame for retaining the printed circuit board; and
a vibrator assembly including a vibrator motor physically connected to the frame and electrically connected to a vibrator contact plate, the vibrator contact plate having an aperture, wherein two electrical contacts are disposed on a surface of the contact plate adjacent to the aperture each at opposing ends thereof for establishing an electrical connection with the printed circuit board,
wherein the vibrator contact plate includes an electrically conductive element disposed on its bottom surface and electrically connected to the negative electrical contact.

14. A mobile communications device according to claim 13, wherein:
the vibrator motor is physically connected to the frame of the mobile communications device such that vibrations from the motor can propagate through the frame of the mobile communications device.

15. A mobile communications device according to claim 13, wherein:
the vibrator motor is electrically connected to the vibrator contact plate by flexible wires that dampen the propagation of vibrations from the vibrator motor to the contact plate.

16. A mobile communications device according to claim 13, wherein:
the vibrator contact plate has an upper surface, a lower surface and an aperture for receiving a fastener, and wherein the electrical contacts are disposed on opposite sides of the aperture.

17. A mobile communications device according to claim 16, wherein:
the printed circuit board has an aperture for receiving the fastener and corresponding electrical contacts disposed on opposing sides of the aperture, such that the vibrator contact plate may be mechanically connected to the printed circuit board with the fastener, thereby establishing secure electrical contacts between the printed circuit board and the contact plate.

18. A mobile communications device according to claim 17, wherein:
a frame element of the personal communications device includes an aperture adapted to receive the fastener; and
the vibrator contact plate and the printed circuit board are connected to the frame element of the personal communications device by the fastener.

19. A vibrator contact plate for establishing an electrical connection between a printed circuit board and a vibrator motor for use in a mobile communications device, the vibrator contact plate having an upper surface and a lower surface and having an aperture for receiving a fastener and having two electrical contacts disposed on the upper surface adjacent the aperture each at opposing ends, wherein:
the vibrator contact plate includes an electrically conductive element disposed on its bottom surface and electrically connected to the negative electrical contact.

20. A vibrator contact plate according to claim 19, wherein:
the electrically conductive element on the bottom surface of the vibrator contact plate is disposed substantially opposite the negative electrical contact element.

21. A vibrator contact plate according to claim 19, wherein:
electrically conductive connectors extend through the vibrator contact plate to provide an electrical connection between the negative contact plate and the electrically conductive element on the bottom surface of the vibrator contact plate.

22. A vibrator contact plate according to claim 19, wherein:
the vibrator contact plate includes a sacrificial portion physically connected to the connector by a neck segment, the sacrificial portion adapted for connection to an automatic assembly mechanism which positions the contact plate for assembly.

23. A vibrator assembly according to claim 22, wherein:
the sacrificial portion is removed by breaking the contact plate at the neck segment.

24. A method of making a mobile communications device having a vibrator assembly for vibrating the device to provide notice of an incoming communications message, comprising the steps of:
providing a frame for housing the communications device, the frame including an aperture for receiving a fastener;
positioning a vibrator assembly adjacent the frame, the vibrator assembly including a vibrator motor adapted to fit in a compartment within the frame and a vibrator contact plate having an aperture adapted to receive a fastener and having two electrical contacts disposed on the upper surface adjacent the aperture each at opposing ends, the vibrator contact plate assembly being positioned so as to place the aperture substantially in axial alignment with the aperture in the frame;

positioning a printed circuit board adjacent the vibrator assembly, the circuit board having electrical and electromechanical components for transceiving electromagnetic signals and further having an aperture adapted to receive a fastener and having electrical contacts on opposing sides of the aperture on a surface of the circuit board and corresponding to the electrical contacts on the vibrator contact plate, the printed circuit board being positioned so as to place the aperture substantially in axial alignment with the aperture in the frame and the aperture in the vibrator contact plate; and connecting the vibrator assembly and the printed circuit board to the frame by passing a fastener through the apertures in the vibrator assembly and the printed circuit board and securing the fastener to the aperture in the frame.

* * * * *